Mar. 20, 1923.
S. S. BATLOUNEY
1,449,258
VEHICLE SIGNAL
Filed Oct. 4, 1922
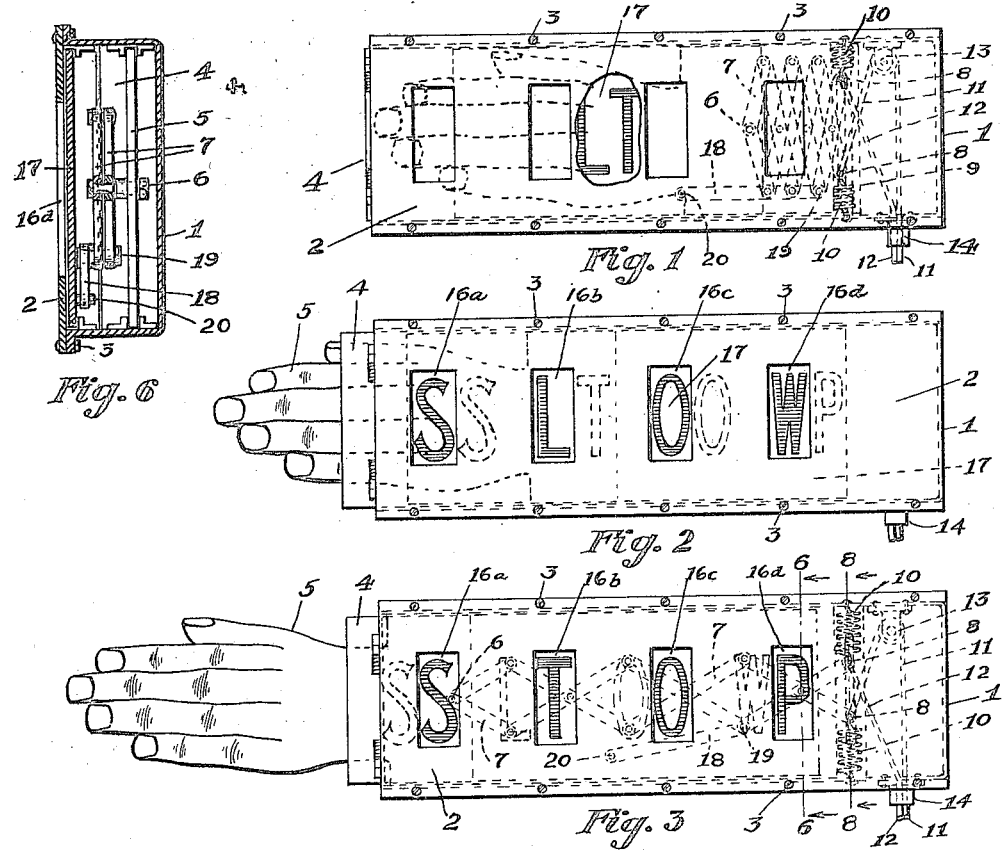
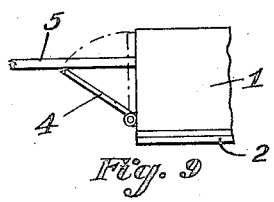
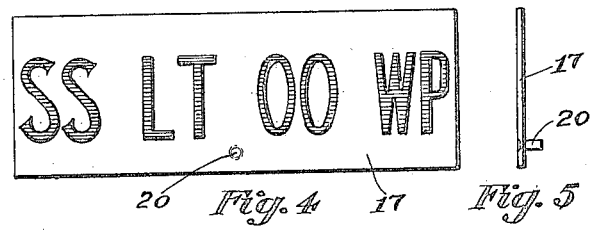
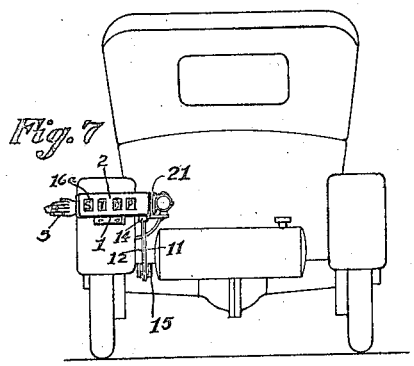
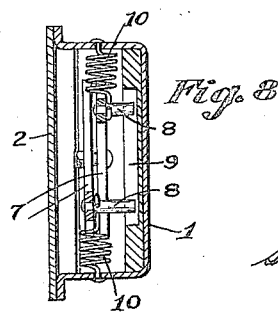
Inventor.
Shekry S. Batlouney Patented Mar. 20, 1923.

1,449,258

UNITED STATES PATENT OFFICE.

SHECKRY S. BATLOUNEY, OF DOVER, NEW HAMPSHIRE.

VEHICLE SIGNAL.

Application filed October 4, 1922. Serial No. 592,427.

*To all whom it may concern:*

Be it known that I, SHECKRY S. BATLOUNEY, a citizen of the United States, residing at Dover, in the county of Strafford and State of New Hampshire, have invented new and useful Improvements in Vehicle Signals, of which the following is a specification.

This invention relates to visible signals on all classes of motor vehicles and is designed for use on either the forward or rearward end of such conveyances, but is principally adapted to be used on the rearward end to warn the vehicle following of the intention of the driver to either slow-up or stop.

It may be attached, by a bracket or clamp, to any conspicuous part of the body or mud-guard of the vehicle and is ordinarily intended to be operated through a connection to certain movable parts of the brake mechanism, as for instance the brake-rods, so that in the act of applying the brakes to the vehicle the signal will automatically function; it may, however, be operated by means independent of the brakes, as any suitable combination of cables and levers extending forward to, and within easy reach of, the driver may be utilized. And in this application I do not confine myself to any one particular actuating system alone, as the meaning and intent of my invention will be fulfilled and the proper functioning of all elements of the device be accomplished by the adoption of either method mentioned.

I wish, however, to call attention to one feature of the invention which I believe merits particular notice,—namely, the progressive method of signaling in which both the "slow" and "stop" signals may be given by the operator of the vehicle by the use of one continuous forward movement of the actuating means.

In the drawing accompanying this specification the apparatus is clearly illustrated and hereinafter will be given a concise description of the duties of each part entering into its construction, with the novel features more particularly pointed out in the appended claim.

In Fig. 1 is seen a front or face view of the signal box with a portion of the cover broken away to show the letter-signaling slide; this view shows the apparatus in what I term its normal or in-operative position; Fig. 2 shows the apparatus with the index-signaling slide partially exposed to view and the letter-signaling slide moved forward to the "slow" signal position; Fig. 3 illustrates the box with the index-signaling slide fully advanced and the "stop" signal appearing through the openings in front; Fig. 4 is a front or face view of the letter-signaling slide; Fig. 5 a side view of the last mentioned part; Fig. 6 is a cross-sectional elevation of the device, taken on line 6—6, Fig. 3; Fig. 7 a rear end view of a motor-car with the signaling apparatus mounted on the rear mud-guard of same; Fig. 8 is a cross-sectional elevation of the apparatus, taken on line 8—8, Fig. 3, and Fig. 9 is a fragmentary plan view of the box, showing the spring-hinged door opened and the index-signaling slide partly exposed to view.

Similar numerals refer to similar parts throughout the several views of the drawing.

The character 1 represents the signal box, one end of which is open. It contains working parts of the mechanism; 2 is a cover secured to the front of the box by screws 3, 3. At the open end of the box is a spring-hinged door 4, which in the normal position of the working parts is closed, but is opened automatically by the index-signaling slide 5 when the latter is extended. Actuating this slide 5, by the connecting pin 6 is a lazy-tongs system of levers, 7, 7. To the inner extremities of this lazy-tongs are secured projecting pins 8, 8, operating in a guiding slot 9, to restrain and direct the movement of the lazy-tongs. Springs 10, 10, with fixed ends secured to the top and bottom sides of the box and their free ends secured to the pins 8, 8, bring the lazy-tongs back to normal position after being extended. Also connecting the lazy-tongs, on pins 8, 8, are cables 11 and 12, the former running over pulley 13 and the latter passing directly to bushing 14,—both cables extending downwardly and out of the box through this bushing, and after running over a guide or pulley 15, (see Fig. 7) the cables, which at this juncture act as one, extend forward and are secured to some movable part of the brake mechanism, as for instance a brake rod, which makes the signaling automatic in its action. Or if the device is to be operated by independent means the cables are still further extended to be within easy reach of the driver and any suitable arrangement of levers and guides made to obtain tension on the cables.

It will be noted that cover 2 has four openings, 16ª, 16ᵇ, 16ᶜ and 16ᵈ, with intervening partitions or masks of double the width of each of the above named openings. In Fig. 4 is seen the letter signaling slide 17 with four groups of two letters each, namely, SS, LT, OO, and WP, with intervening spaces between each group, each equal to the width of one of the openings in cover, as 16ª etc.

In Fig. 1 which is the normal or in-operative position of all the parts no letters on the letter-signaling slide are visible, all the groups of characters being hidden behind the partitions or masks between the openings 16ª, 16ᵇ etc., in the cover. In Fig. 2 a slight pull or movement forward of the cables 11 and 12 has brought the index-signaling slide partially out of the box, and also exposed to view the first letters of each double group on the letter-signaling slide, namely S-L-O-W. A further movement of the cables, as seen in Fig. 3, will have brought the index-signaling slide 5 to its extreme outward position, and also exposed to view the last letters in each of the double groups,—namely, S-T-O-P, the previously exposed letters having become hidden behind the partitions on the cover.

Releasing the tension on cords 11 and 12 will, through the agency of the springs, 10, 10 bring the lazy-tongs, and with them the two signaling slides, back to normal position of parts, and allow the door 4 to close over the open end of the box. The movement of the index-signaling slide 5 and the letter-signaling slide 17 is synchronous, made so by a lever 18 connecting lazy-tongs at joint 19 and letter-signaling slide on pin 20. It will be observed that the index-signaling slide travels farther and faster than the letter-signaling slide, due to the fact that they are attached to the lazy-tongs at widely different points.

As has already been stated in the preamble, the apparatus herein described is applicable for use on the forward end of a vehicle, but in this case I may prefer to substitute for the words "S-L-O-W" and "S-T-O-P" on the letter-signaling slide, some other combination of characters, as for instance, "R-I-T-E" and "L-E-F-T," signifying to the traffic officer the direction in which the driver of the vehicle desires to proceed. In all other particulars the device will be similar, and the same actuating means will apply as with the rearwardly mounted signal.

To increase the usefulness of the device for night work I utilize the "tail" lamp equipped with a white side light 21 which will illuminate the front of signal box.

Having thus described my invention, I claim:

A vehicle signaling device consisting of an open end box, an index-signaling slide within said box, an extensible arm, consisting of a lazy-tongs system of levers adapted to propel and return said index-signaling slide out of and into said box, a letter-signaling slide within said box, means for actuating said letter-signaling slide in conjunction with said index-signaling slide, openings, with intervening masking partitions, in the front side of said box, characters or letters on the front face of said letter-signaling slide arranged in groups of two with intervening spaces between each group, means for alternately exposing to view, through the said openings in the front of said box, two different word signals by the action of one continuous forward movement of said letter-signaling slide, means whereby but one word signal may be visible at one time, means for actuating said extensible arm and means for returning said extensible arm, together with both signaling slides to their original and in-operative position within said box, substantially as described.

SHECKRY S. BATLOUNEY.